US006718167B2

(12) United States Patent
Visee

(10) Patent No.: US 6,718,167 B2
(45) Date of Patent: Apr. 6, 2004

(54) FILTER CENTER FREQUENCY TEMPERATURE COMPENSATION BY ADJUSTMENT OF THE OPERATING FREQUENCY OF THE HOST SYSTEM

(75) Inventor: Maarten Visee, Houten (NL)

(73) Assignee: Agere Systems Inc., Allentown, PA (US)

( * ) Notice: Subject to any disclaimer, the term of this patent is extended or adjusted under 35 U.S.C. 154(b) by 39 days.

(21) Appl. No.: 10/210,249

(22) Filed: Aug. 1, 2002

(65) Prior Publication Data

US 2004/0023632 A1 Feb. 5, 2004

(51) Int. Cl.[7] .................................................. H04B 1/16
(52) U.S. Cl. ..................... 455/339; 455/208; 455/182.1; 455/315
(58) Field of Search ................................ 455/283, 295, 455/340, 310, 315, 316, 339, 207, 208, 209, 256, 126, 254, 276.1, 501, 275, 70, 77, 182.1, 317; 333/186, 188

(56) References Cited

U.S. PATENT DOCUMENTS

| 5,475,871 A | * | 12/1995 | Shalev et al. | 455/266 |
|---|---|---|---|---|
| 5,649,320 A | * | 7/1997 | Korhonen et al. | 455/316 |
| 5,781,851 A | * | 7/1998 | Saito | 455/182.1 |
| RE36,973 E | * | 11/2000 | Shigemori | 455/231 |
| 6,363,123 B1 | * | 3/2002 | Balodis | 455/12.1 |
| 6,631,265 B2 | * | 10/2003 | Holden et al. | 455/340 |

* cited by examiner

Primary Examiner—Nay Maung
Assistant Examiner—John J Lee

(57) ABSTRACT

An electronic circuit includes a frequency conversion device (4), an oscillator (6), a band-pass filter (8), and a controller (14). The oscillator (6) is connected to the frequency conversion device (4), and the frequency conversion device (4) is connected to the band-pass filter (8). The frequency conversion device (4) is arranged to receive a first signal (S1) at a frequency ($f_r$), and to transform the first signal (S1) into an intermediate frequency signal (S2) at an intermediate frequency ($f_i$) by applying a selection frequency ($f_{loc}$) from the oscillator (6). The band-pass filter (8) is arranged to receive the intermediate signal (S2) and to perform a band-pass filtering at a centre frequency ($f_{bpf}$) and with a bandwidth ($f_w$), the centre frequency ($f_{bpf}$) being equal to the intermediate frequency ($f_i$) at a predetermined working temperature of the band-pass filter (8). The controller (14) is capable of receiving data indicative of a shift of the centre frequency ($f_{bpf}$) due to a temperature deviation of the band-pass filter (8) from the predetermined working temperature and controlling the selection frequency ($f_{loc}$) of the oscillator (6) for changing the intermediate frequency ($f_i$) to follow the shift of the centre frequency ($f_{bpf}$).

13 Claims, 4 Drawing Sheets

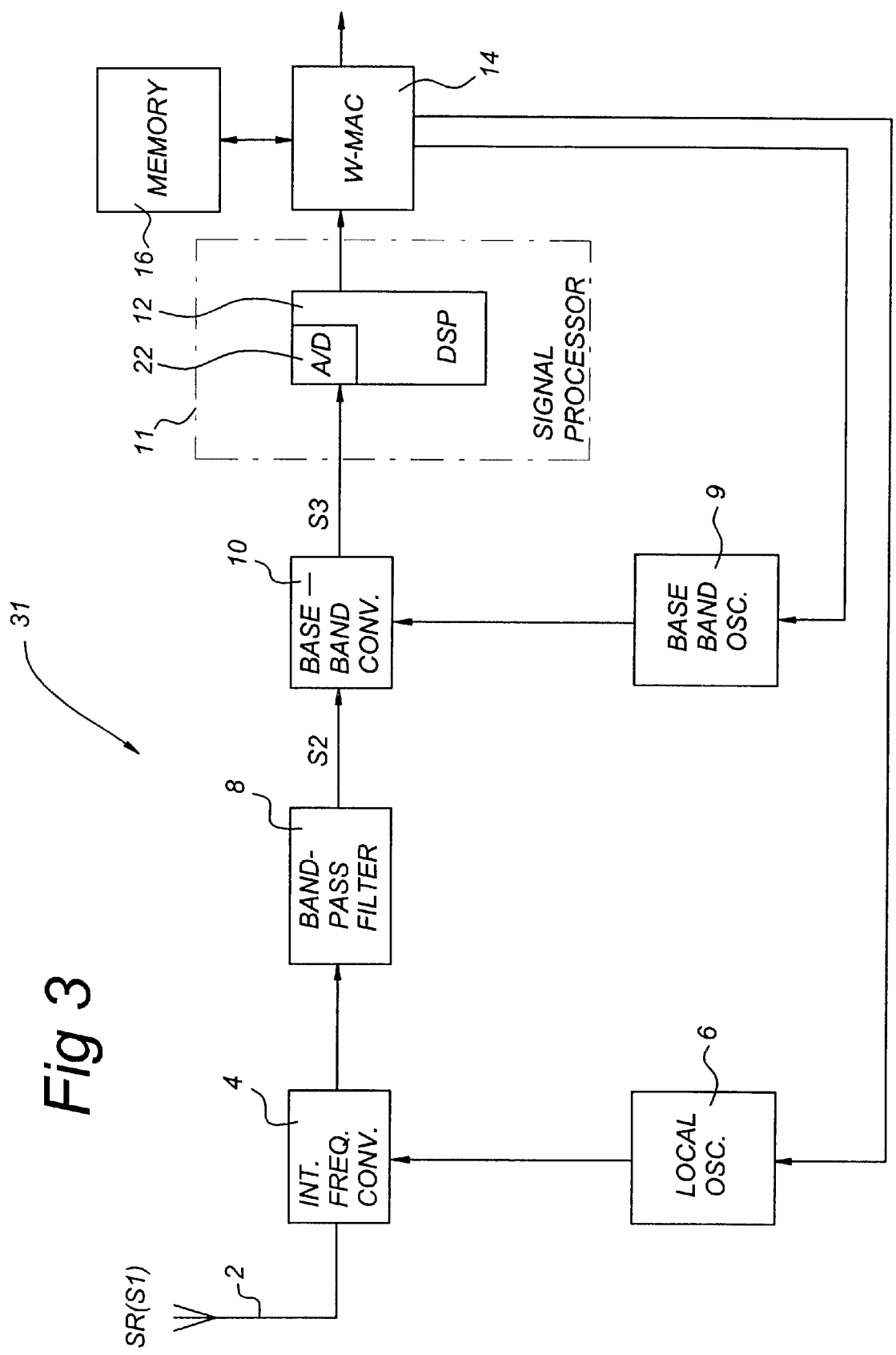

US 6,718,167 B2

FILTER CENTER FREQUENCY TEMPERATURE COMPENSATION BY ADJUSTMENT OF THE OPERATING FREQUENCY OF THE HOST SYSTEM

FIELD OF THE INVENTION

The present invention relates to radio receiver circuitry.

PRIOR ART

In communications systems, the receiver circuit employing Intermediate Frequency Band-Pass Filtering is known to have temperature dependent centre frequency characteristics. The temperature of the intermediate frequency band-pass filter (IF BPF) increases while the communications system is in use, and causes a shift of the centre frequency of the IF BPF. Generally, the temperature dependence is stronger for cheaper filters and/or filters with smaller dimensions.

Under normal conditions, the bandwidth of an IF BPF is chosen slightly larger than the bandwidth of a selected signal (i.e., a signal in a specific selected channel) to separate only that signal (or: channel) from other signals, present in the medium. For example: in the 5 GHz ISM (Industrial, Scientific and Medical) band for wireless communications, the signal bandwidth for OFDM (Orthogonal Frequency Division Multiplexing modulation) is typically 16.6 MHz, the IF BPF has a bandwidth of 18 MHz, and the separation of the centre frequencies of adjacent transmission channels is 20 MHz.

If the centre frequency of the IF BPF changes due to a change of temperature of the filter, the selected signal may be cut-off at one of the bandwidth boundaries of the intermediate frequency band-pass filter, which may cause a loss of signal strength. Also, since transmission channels are closely spaced to each other, a signal in an adjacent channel may enter into the bandwidth of the IF BPF and may distort the selected signal in the signal processing steps after passing the IF BPF.

Disadvantageously, these operational changes of the IF BPF result in a condition where the received selected signal cannot be processed reliably anymore, causing the communications system to fail its specifications due to, e.g., a high Bit Error Rate, or a low reception sensitivity.

SUMMARY OF THE INVENTION

It is an object of the present invention to provide an electronic circuit comprising an intermediate frequency band-pass filter, which compensates for the shift of the centre frequency of such a filter, due to a change in temperature.

The present invention relates to an electronic circuit having a controller arranged to receive data indicative of a shift of the intrinsic centre frequency due to a temperature change of the band-pass filter from the predetermined working temperature and to control the first selection frequency of the local oscillator for changing the intermediate frequency of the intermediate signal to follow the shift of the intrinsic centre frequency.

Thus, the present invention provides an electronic circuit which processes a selected signal reliably, irrespective of the operating temperature of the band-pass filter.

Moreover, the present invention allows the use of a standard band-pass filter without the need for a more expensive band-pass filter with less temperature-dependent properties.

Also, the present invention relates to a method to be carried out by a controller. The method carried out by the controller includes the steps of:

receiving data indicative of a shift of the intrinsic centre frequency due to a temperature deviation of the band-pass filter from the predetermined working temperature, and controlling the first selection frequency of the local oscillator for changing the intermediate frequency of the intermediate signal to follow the shift of the intrinsic centre frequency.

BRIEF DESCRIPTION OF DRAWINGS

The present invention will be explained with reference to some drawings, which are intended for illustration purposes only and not to limit the scope of protection as defined in the accompanying claims.

FIG. 3 shows a schematic diagram of an electronic circuit according to the present invention in a second preferred embodiment as part of a receiver of a communications system.

DESCRIPTION OF PREFERRED EMBODIMENTS

An electronic circuit according to the present invention as part of a receiver of a communications system is preferably part of a receiver and may be applied in a wireless communications system such as a mobile telephone for selecting and receiving wireless signals, broadcasted to that mobile phone. Also, the electronic circuit of the present invention may be applied as part of an interface card in a personal computer for receiving wireless signals from a wireless local area network (LAN). Also, the electronic circuit may be used in a receiver for receiving signals from a wired local area network (LAN).

In the following description, the electronic circuit of the present invention will be described with reference to such a receiver.

However, it will also be appreciated that the electronic circuit of the present invention may not only be employed in receivers but also in transmitters. Moreover, the electronic circuit of the present invention may be employed in any electronic device for signal processing that uses band-pass filtering techniques.

Figure 1:
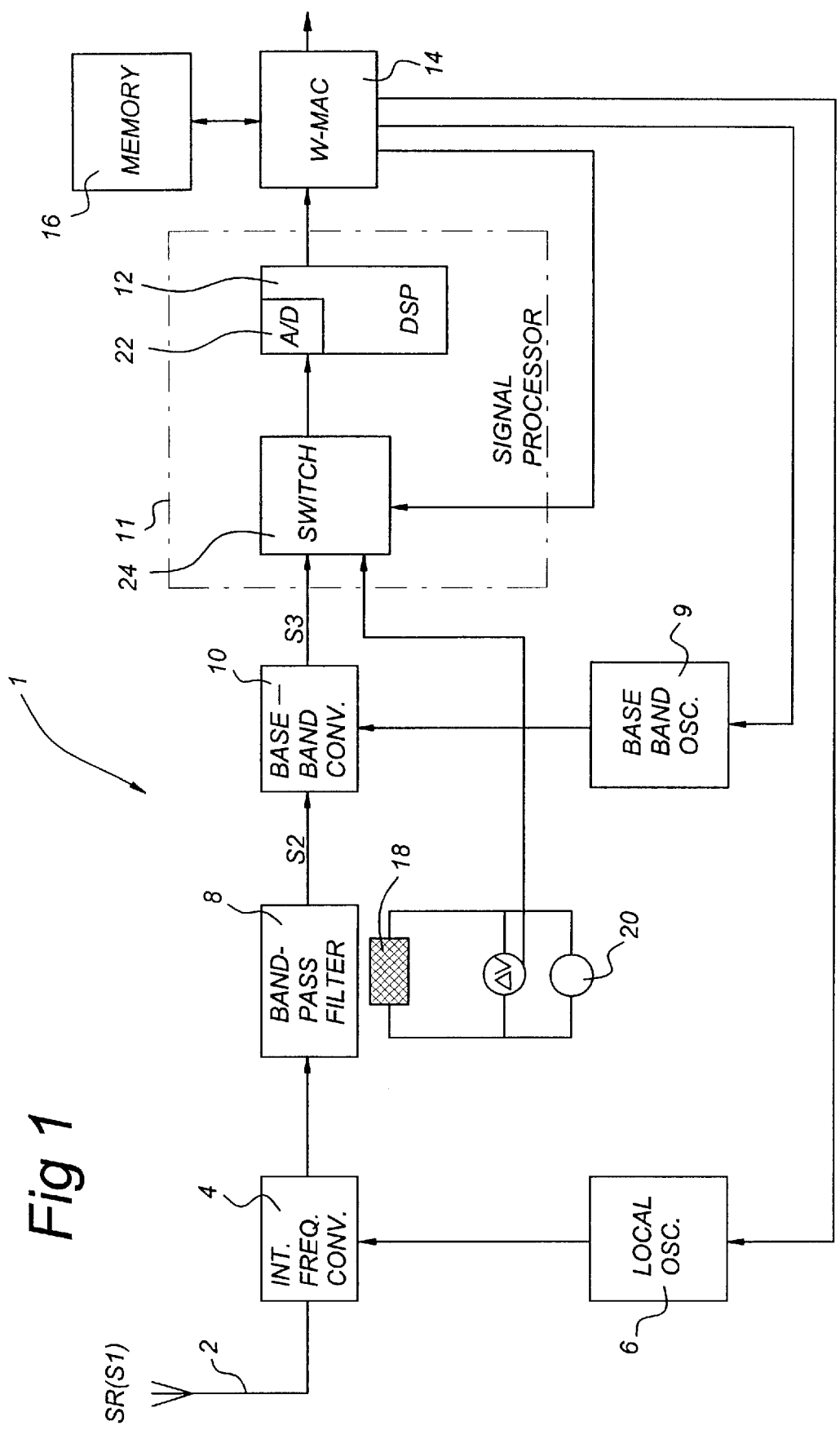
FIG. 1 shows a schematic diagram of an electronic circuit according to the present invention in a first preferred embodiment as part of a receiver of a communications system.

FIG. 1 shows a schematic diagram of an electronic circuit according to the present invention in a first preferred embodiment as part of a receiver of a communications system. The receiver 1 comprises an antenna 2, an intermediate frequency conversion device 4, a tuneable local oscillator 6, a band-pass filter 8, a tuneable base-band oscillator 9, a base-band conversion device 10, signal processing means 11, a (wireless) medium access controller (W-MAC) 14, memory 16, a temperature sensor 18, and a current source 20.

The antenna 2 is connected to the intermediate frequency conversion device 4, which is further connected to the tuneable local oscillator 6 and the band-pass filter 8. The band-pass filter 8 is connected to the base-band conversion device 10, which connects to the signal processing means 11. In this first embodiment, the signal processing means 11 comprise a digital signal processing unit (DSP) 12, an analog-digital converter 22 and a switching device 24. Here, the base-band conversion device 10 connects to the switching device 24, which connects to the analog-digital converter 22. The analog-digital converter 22 is preferably embedded in the DSP 12. Further, the base-band conversion device 10 is connected to the tuneable base-band oscillator 9. The DSP 12 is connected to the W-MAC 14. Also, the memory 16 is connected to the W-MAC 14. The temperature sensor 18 is also connected to the switching device 24. Further, the temperature sensor 18 is connected in a closed loop to the current source 20. The W-MAC 14 is also connected to the tuneable local oscillator 6, the tuneable base-band oscillator 9, and to the switching device 24.

As known to persons skilled in the art, the memory 16 may comprise various kinds of memory such as random access memory (RAM), read-only memory (EEPROM, ROM or Flash), and hard disk.

Reception of signals, present in the medium, is done by the antenna 2, which passes all received signals SR to the intermediate frequency conversion device 4. The selection of a particular signal S1 at a broadcast frequency $f_t$ from the received signals SR is done by setting the local oscillator 6 to such a frequency $f_{loc}$ that after processing in the intermediate frequency conversion device 4, the signal S1 is transformed into a selected signal S2 with an intermediate frequency $f_i$ which substantially matches the centre frequency $f_{bpf}$ of the band-pass filter 8. The transformation by the intermediate frequency conversion device 4 comprises the synthesis of the intermediate frequency $f_i$ as the difference of the broadcast frequency $f_t$ of S1 and the local oscillator frequency $f_{loc}$ ($f_i=f_t-f_{loc}$ or $f_i=f_t+f_{loc}$).

Ideally, only the selected signal S2 is within the bandwidth of the band-pass filter 8 for passing to the base-band conversion device 10. The base-band conversion device 10 transforms the signal S2 into the base-band signal S3, which is to be processed by the DSP 12. It will be appreciated by persons skilled in the art, that here the conversion device 10 may transform the signal S2 into a signal S3 in a second intermediate frequency band, if desired.

The temperature sensor 18 is located close to the band-pass filter 8 to sense the temperature of the band-pass filter 8 in an accurate manner. In this first embodiment of the present invention, the temperature sensor 18 provides a temperature dependent signal $\Delta T$, related to the temperature of the band-pass filter 8, to the switching device 24 for passing to the DSP 12 for further processing of $\Delta T$. The temperature sensor 18 may be a resistor with a temperature dependent resistivity coefficient. Also, the temperature sensor 18 may be a temperature dependent diode or another type of device which is capable of providing a temperature dependent signal $\Delta T$. In the embodiment of FIG. 1, the temperature sensor 18 is shown as a temperature dependent resistor.

Under control by the W-MAC 14 (wireless medium access controller), the analog-digital converter 22 on the DSP 12 measures a voltage drop $\Delta V$ over the temperature sensor 18. To generate the voltage drop $\Delta V$, the current source 20 supplies a small constant current to the temperature sensor 18 with minimal heat dissipation, preferably none. Thus, the voltage drop $\Delta V$ may be proportional to the change of the temperature $\Delta T$ of the band-pass filter 8, relative to a given reference temperature.

It is noted that the temperature sensor 18 may be a passive element such as a thermocouple, which generates a temperature-related voltage signal, as known to persons skilled in the art. In that case, current source 20 may be omitted.

The temperature signal $\Delta T$ is passed to the switching device 24. In order to avoid interference with the reception of the selected signal S1, the W-MAC 14 controls at which instant the switching device 24 may switch the voltage drop signal of the temperature sensor 18 to the DSP 12 for measuring the voltage.

Preferably, the DSP 12 is arranged to capture and process the temperature signal $\Delta T$ (i.e., $\Delta V$) at regular intervals without disturbing the reception and transmission of signals by the communications system. To measure the value of the voltage drop $\Delta V$, the DSP 12 uses the embedded analog-digital converter 22. The DSP 12 is arranged to pass the measured value to the W-MAC 14. The W-MAC 14 is arranged to compare the measured value of $\Delta V$ with empirical data stored in the memory 16.

The change of the band-pass filter frequency $f_{bpf}$ as a function of the temperature of the band-pass filter 8 can be empirically established in an experimental set-up and the results recorded as a function of the temperature change $\Delta T$ and/or the voltage drop $\Delta V$. This empirical relationship between the shift of the centre frequency of the band-pass filter 8 and the temperature change $\Delta T$ is preferably stored in the memory 16. (It is known that certain types of intermediate frequency band-pass filters comprising e.g., $LiNbO_3$ typically display a negative temperature coefficient for the shift of the centre frequency as a function of increasing temperature.)

By comparison of the measured value of $\Delta V$ with these empirical data, the W-MAC 14 is capable of controlling the frequency $f_{loc}$ of the local oscillator 6 to adjust the intermediate frequency $f_i$ of the selected signal S2 to remain within the bandwidth of the band-pass filter 8. Simultaneously, the W-MAC 14 controls the frequency $f_{bb}$ of the base-band oscillator 9 to produce the selected signal S3 in the base-band domain in correspondence with the intermediate frequency $f_{im}$ of the selected signal generated in the intermediate frequency conversion device 4.

The temperature compensation will now be explained below.

Figure 2A:
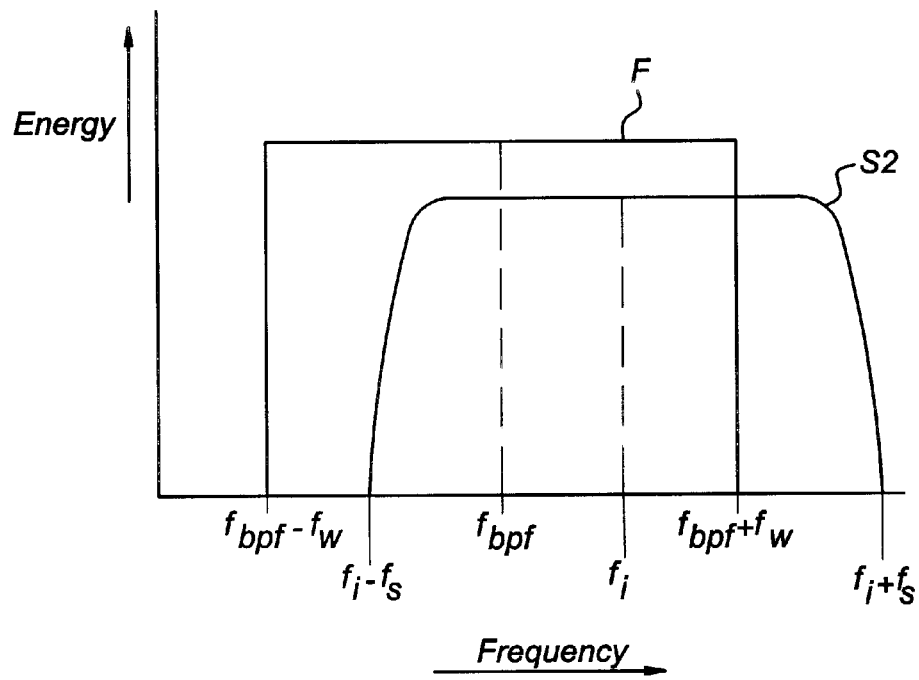
FIGS. 2a and 2b show a schematic graph of an intermediate frequency spectrum and a corresponding base-band frequency spectrum, respectively, before temperature compensation.
Figure 2B:
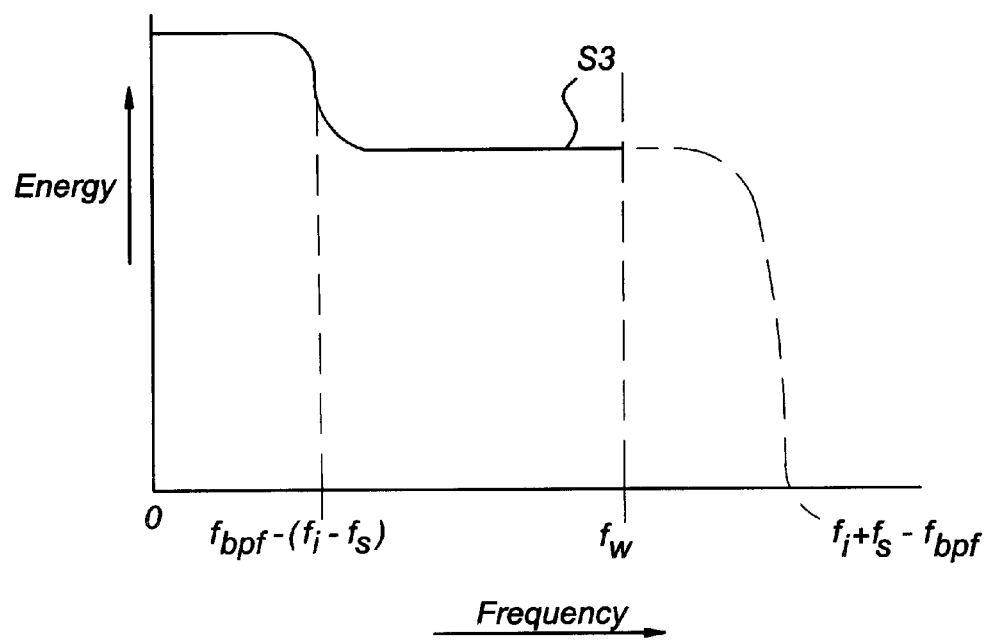

FIGS. 2a and 2b show a schematic graph of an intermediate frequency spectrum and a corresponding base-band energy distribution frequency spectrum, respectively, before temperature compensation.

FIG. 2a shows schematically the selected signal S2 and the frequency window F of the band-pass filter 8 as a function of the frequency. The reception energy level of S2 is plotted in the vertical direction as a function of the intermediate frequency (on the horizontal axis). The selected signal S2 has a centre intermediate frequency $f_i$. The band-pass filter 8 has a centre frequency $f_{bpf}$ and a full-width $2f_w$.

Due to a temperature change $\Delta T$ in operating temperature of the band-pass filter 8 as argued above, the frequency window of the band-pass filter 8 is shifted with respect to the selected signal S2. The centre frequency of the band-pass filter 8 $f_{bpf}$ is at a lower frequency than the intermediate frequency $f_i$ of the selected signal S2. The selected signal S2 extends over the high frequency boundary of the band-pass filter 8, with the high-frequency limit $f_i+f_s$ of the selected signal outside the bandwidth of the band-pass filter 8. The low-frequency limit of the selected signal $f_i-f_s$ is within the bandwidth of the band-pass filter 8.

In FIG. 2b the energy distribution of the base-band signal S3 is plotted in the vertical direction as a function of the base-band frequency (on the horizontal axis) in accordance to the plot of the selected signal S2 in the band-pass frequency domain as depicted in FIG. 2a.

In FIG. 2b, the dashed vertical line at $f_w$ indicates the boundaries of the band-pass filter 8. The centre frequency of the band-pass filter 8, $f_{bpf}$, corresponds to a base-band frequency of zero. The solid line depicts the energy level as a function of the band-pass filter's frequency spectrum transposed to base-band frequency. Due to the asymmetry of the selected signal S2 with respect to the position of the (shifted) band-pass filter 8, the reception energy levels of base-band signal S3 will appear in the base-band domain as a two-level energy distribution with an inflexion lower limit frequency $f_{bpf}-(f_i-f_s)$ of the base-band signal S3.

The tail of the signal S3 above frequency $f_w$ is plotted as a dotted line. The tail extends to approximately the frequency $f_i+f_s-f_{bpf}$. As known to those skilled in the art, the part of the signal S3 above frequency $f_w$ is outside the band-pass filter window and thus discarded for further processing by the DSP 12. The W-MAC 14 receives the value of $\Delta T$ from the DSP 12, and controls the adjustment of the intermediate frequency $f_i$ of the selected signal S2 by changing the frequency setting of the local oscillator 6. The actual setting of the frequency $f_{loc}$ of the local oscillator 6 is derived by the W-MAC 14 from the empirical data stored in memory 16. The frequency $f_{bb}$ of the base-band oscillator 9 is adjusted simultaneously by the W-MAC 14.

Figure 2C:
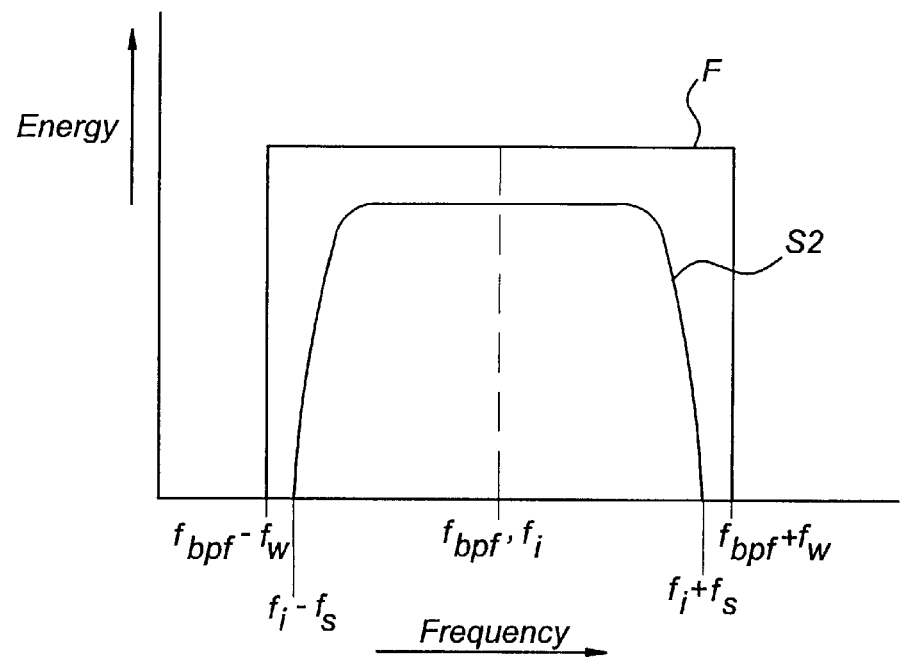
FIGS. 2c and 2d show a schematic graph of an intermediate frequency spectrum and a corresponding base-band noise frequency spectrum, respectively, after temperature compensation.
Figure 2D:
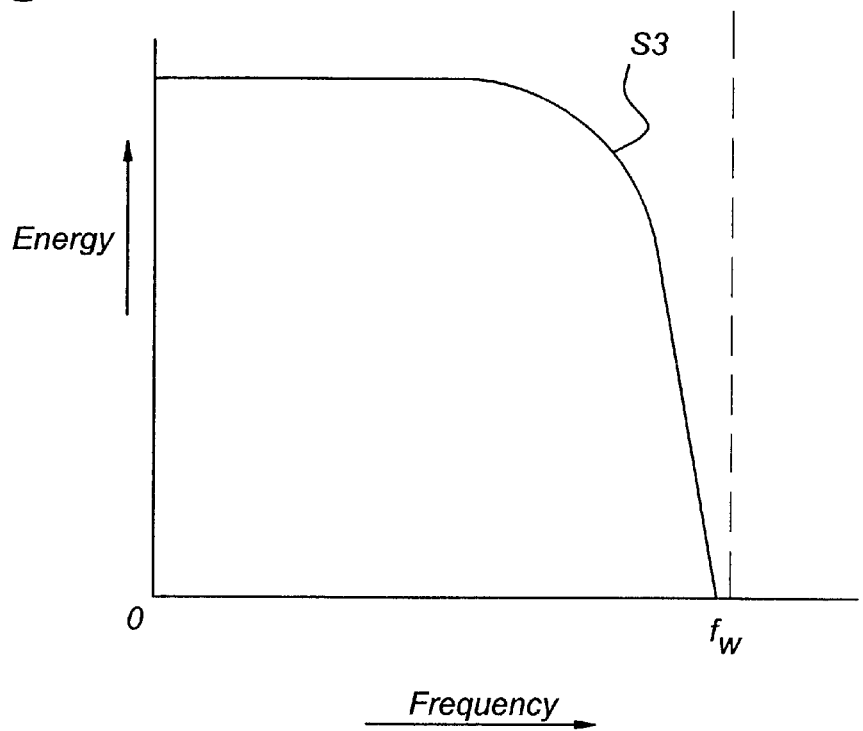

FIGS. 2c and 2d show a schematic graph of an intermediate frequency spectrum and a corresponding base-band energy level frequency spectrum, respectively, after temperature compensation.

FIG. 2c displays schematically the selected signal S2 and the frequency window F of the band-pass filter 8 as a function of the frequency, when the centre frequency $f_{bpf}$ of the band-pass filter 8 is substantially equal to the centre frequency $f_i$ of the selected signal. The reception energy level is plotted in the vertical direction as a function of the intermediate frequency (on the horizontal axis). The band-pass filter 8 has a centre frequency $f_{bpf}$ with a full-width $2f_w$.

In this situation, which occurs after temperature compensation, the modified intermediate frequency $f_{im}$ of the selected signal S2 has been reduced, relative to the intermediate frequency $f_i$ of FIG. 2a. (Also, in the ideal case, this situation occurs when the centre frequency of the band-pass filter 8 is temperature-independent.) The selected signal S2 is within the bandwidth of the band-pass filter 8.

The measured energy distribution of the base-band signal S3 is shown in FIG. 2d, where the energy distribution level is plotted as a function of the frequency in the base-band domain. The measured profile appears basically as a single-level energy distribution (with some small tail close to $f_w$).

The compensation of the temperature-related change of the centre frequency of the band-pass filter 8 is accomplished by changing the intermediate frequency of the receiver 1 as discussed with reference to the first embodiment shown in FIG. 1.

FIG. 3 shows a schematic diagram of an electronic circuit according to the present invention in a second preferred embodiment as part of a receiver of a communications system.

In FIG. 3, entities with the same reference numbers as used in FIG. 1, refer to the same entities as shown in FIG. 1. The receiver 31 of the wireless communications system of FIG. 3 is almost identical to the receiver 1 shown in FIG. 1, except for the temperature sensor 18, the current source 20, and the switching device 24, which have been omitted in the second preferred embodiment.

In the embodiment of FIG. 3, the shift of the centre frequency of the band-pass filter 8 as a function of temperature is monitored by the DSP 12 by measuring the energy level distribution of the base-band signal S3 as a function of the base-band frequency.

The base-band signal S3 is derived from the selected signal S2 as enclosed within the bandwidth of the band-pass filter 8. Whereas the spectrum of the band-pass filter is centred around a centre frequency $f_{bpf}$ and extends from $f_{bpf}-f_w$ to $f_{bpf}+f_w$, with $f_w$ being the half-width of the band-pass filter, the base-band spectrum extends from a frequency of zero to a frequency of $f_w$. Band-pass signal frequencies below $f_{bpf}$ are transposed to frequencies above the base-band zero frequency, and the intensity of such frequencies is added to the intensity of the band-pass signal frequencies above $f_{bpf}$.

In the embodiment of FIG. 3, the DSP 12 probes the energy level within the bandwidth of the base-band as a function of the base-band frequency, as passed by the band-pass filter 8, to establish the reception energy level of the band-pass filter 8 and it's position with respect to the position of a selected signal S2 at the intermediate frequency $f_i$. This will be explained in more detail below.

The probing of the base-band spectrum by the DSP 12 is done in relatively small frequency increments compared to the bandwidth of the band-pass filter 8. For example, the probing increment is about 100 kHz or less, at a bandwidth of 18 MHz.

The probing procedure by the DSP 12 and it's result will now be explained with reference to FIGS. 2a, 2b, 2c, and 2d.

When the centre frequency of the band-pass filter 8 shifts due to a change of operating temperature, the selected signal S2 (centred at the intermediate frequency as set by the local oscillator 6) will be partly outside of the bandwidth of the band-pass filter 8 (see FIG. 2a).

The DSP 12 probes the energy level distribution of the corresponding base-band signal S3 and passes the probing result to the W-MAC 14. When the W-MAC 14 detects a two-level distribution as shown in FIG. 2b, correction of the position of the intermediate frequency signal S2 with respect to the band-pass frequency $f_{bpf}$ is required. Again, as in the first embodiment, by changing the intermediate frequency $f_i$ of the selected signal S2 (by means of the intermediate frequency conversion device 4) to match the shifted band-pass filter frequency $f_{bpf}$, the selected signal S2 can be shifted to be within the bandwidth boundaries of the band-pass filter 8. The frequency of the local oscillator 6 is adapted to modify the intermediate frequency $f_i$ of S2. At the same time, the frequency of the base-band oscillator 9 is changed accordingly.

When the temperature change actually becomes so large that the selected signal may be partly outside of the bandwidth of the band-pass filter 8, the W-MAC 14 controls the frequency $f_{loc}$ of the local oscillator 6 to change the intermediate frequency $f_i$ of the selected signal S2, as synthesised in the intermediate frequency conversion device 4, to a new intermediate frequency value $f_{im}$ in such a way that the selected signal S2 is within the bandwidth of the band-pass filter 8 and the intermediate frequency $f_{im}$ again substantially matches the centre frequency $f_{bpf}$ of the band-pass filter 8 that shifted under thermal load (see FIG. 2c). The base-band frequency spectrum will comprise a single-level energy distribution as shown in FIG. 2d.

The profile measured by the DSP 12, is evaluated by the W-MAC 14 (preferably by comparison with a reference profile). Similar to the situation for the first embodiment, as a response to the outcome of the measured profile, the W-MAC 14 controls the frequency $f_{loc}$ of the local oscillator 6 to change the intermediate frequency $f_i$ of the selected signal S2, as synthesised in the intermediate frequency conversion device 4, to a new frequency value $f_{im}$ in such a way that the selected signal S2 remains within the frequency window of the band-pass filter 8. Simultaneously, the W-MAC 14 controls the frequency $f_{bb}$ of the base-band oscillator 9 to produce a base-band signal S3 corresponding with the new intermediate frequency $f_{im}$ of the selected signal S2 generated in the intermediate frequency conversion device 4.

In the second embodiment of the present invention the probing procedure, as described above, is used to control the temperature compensation. By repeating the probing procedure by the DSP 12, a measured base-band signal profile can be changed from a two-level energy distribution (shown in FIG. 2b) to a single level energy distribution as shown in FIG. 2d by modifying the intermediate frequency generated in the intermediate frequency conversion device 4. Also, by repeated probing, the base-band signal profile can be preserved as a single level energy distribution during a change of temperature of the band-pass filter 8.

As described above, the temperature compensation control in the receiver 1;31 is (conveniently) done by the W-MAC 14. It is noted that a separate processing unit (e.g. a micro-controller) may be used in addition to the W-MAC 14 to perform this task, although this may increase the cost of such a receiver.

Moreover, it will be appreciated by those skilled in the art, that in other embodiments that may readily be understood from the description given above, some of the components in the receiver 1; 31 may be replaced by other components with similar functionality: the wireless medium access controller may be replaced by a micro-controller. Also, the DSP 12 may be a signal processing circuit.

Furthermore, it is noted that the temperature compensation control according to the present invention may also be used in receivers for wired (-LAN) applications that comprise comparable band-pass filters.

It will also be appreciated that the filter centre frequency temperature compensation of the present invention may not only be employed in receivers but also in transmitters by adapting the appropriate frequency conversion devices in such transmitters. Thus, an input signal in a base frequency range which is to be transmitted, may be converted by one or more appropriate frequency conversion devices into a transmittable signal in a transmission band frequency. By application of any one of the methods according to the present invention any temperature-related frequency shift of a frequency conversion device may be corrected.

Moreover, the filter centre frequency temperature compensation of the present invention maybe employed in any electronic device for signal processing that uses band-pass filtering techniques.

It will further be appreciated that other embodiments may be provided in accordance with the present invention. These and other embodiments that may readily be understood from the description given above, will be within the scope of protection as defined in the accompanying claims.

What is claimed:

1. An electronic circuit adapted for being coupled to a system having a frequency signal conversion device, a local oscillator and, a band-pass filter, said local oscillator coupled to said frequency signal conversion device, said frequency signal conversion device coupled to said band-pass filter, said frequency signal conversion device arranged to receive a first signal at a first frequency ($f_r$), to transform said first signal into an intermediate signal at an intermediate frequency ($f_i$) by applying a first selection frequency ($f_{loc}$) received from said local oscillator, said band-pass filter arranged to receive said intermediate signal and to perform a band-pass filtering at an intrinsic centre frequency ($f_{bpf}$) and with a bandwidth ($f_w$), said intrinsic centre frequency ($f_{bpf}$) being substantially equal to said intermediate frequency ($f_i$) at a predetermined working temperature of said band-pass filter wherein the electronic circuit comprises:

a controller arranged to receive data indicative of a shift of said intrinsic centre frequency ($f_{bpf}$) due to a temperature change of said band-pass filter from said predetermined working temperature and to control said first selection frequency ($f_{loc}$) of said local oscillator for changing said intermediate frequency ($f_i$) of said intermediate signal to follow said shift of said intrinsic centre frequency ($f_{bpf}$).

2. Electronic circuit according to claim 1, further comprising a base-band signal conversion device and a base-band oscillator, said base-band oscillator coupled to said base-band signal conversion device, said base-band signal conversion device coupled to said band-pass filter, said base-band signal conversion device arranged to receive said intermediate signal at said intermediate frequency ($f_i$), to transform said intermediate signal into a base-band signal at a base-band frequency by applying a second selection frequency ($f_{bb}$) received from said base-band oscillator, wherein said controller is arranged to control said second selection frequency ($f_{bb}$) of said base-band oscillator for changing said base-band frequency of said base-band signal to follow said shift of said intrinsic centre frequency ($f_{bpf}$).

3. Electronic circuit according to claim 1, wherein said base-band signal at said base-band frequency is a second intermediate signal at a second intermediate frequency.

4. Electronic circuit according to claim 1, wherein said electronic circuit comprises a temperature sensor adjacent to said band-pass filter for producing a temperature-related signal ($\Delta V$), and said controller is arranged to use said temperature-related signal ($\Delta V$) as said data indicative of said shift of said intrinsic centre frequency ($f_{bpf}$).

5. Electronic circuit according to claim 4, wherein said electronic circuit further comprises a signal processing unit and a switch, said switch connected to said base-band conversion device and said temperature sensor for switching between said base-band signal and said temperature-related signal ($\Delta V$), said switch further connected to said signal processing unit for passing said base-band signal or said temperature-related signal ($\Delta V$) to said signal processing unit.

6. Electronic circuit according to claim 1, wherein said electronic circuit further comprises memory means for storing temperature-related calibration data, said memory means connected to said controller, said controller being arranged to fetch said calibration data from said memory means and to use said calibration data to control said first selection frequency ($f_{loc}$).

7. Electronic circuit according to claim 2, wherein said electronic circuit further comprises memory means for storing temperature-related calibration data, said memory means connected to said controller, said controller being arranged to fetch said calibration data from said memory means and to use said calibration data to control said first selection frequency ($f_{loc}$) and said second selection frequency ($f_{bb}$).

8. Electronic circuit according to claim 1, further comprising a base-band signal conversion device, a signal processing unit, and a base-band oscillator, said base-band oscillator coupled to said base-band signal conversion device, said base-band signal conversion device coupled to said band-pass filter, said base-band signal conversion device further coupled to said signal processing unit, said signal processing unit connected to said controller, said base-band signal conversion device arranged to receive said intermediate signal at said intermediate frequency ($f_i$), to transform said intermediate signal into a base-band signal at a base-band frequency by applying a second selection frequency ($f_{bb}$) received from said base-band oscillator (9), wherein said signal processing unit is arranged to sample said base-band signal to establish energy distribution level characteristics within said base-band signal and to pass said energy distribution level characteristics to said controller (14).

9. Electronic circuit according to claim 8, wherein said controller (14) is arranged to evaluate said energy distribution level characteristics, and to control said first selection frequency ($f_{loc}$) of said local oscillator for changing said intermediate frequency ($f_i$) of said intermediate signal and said second selection frequency ($f_{bb}$) of said base-band oscillator for changing said base-band frequency of said base-band signal to follow said shift of said intrinsic centre frequency ($f_{bpf}$) in dependence on said energy distribution level characteristics.

10. Electronic circuit according to claim 8, wherein said electronic circuit further comprises memory means, said memory means connected to said controller (14), said memory means comprising correction data relating said energy distribution level characteristics to said first selection frequency ($f_{loc}$) of said local oscillator and said second selection frequency ($f_{bb}$) of said base-band oscillator, and said controller being arranged to fetch said correction data from said memory means and to use said correction data to control said first selection frequency ($f_{loc}$) and said second selection frequency ($f_{bb}$).

11. Electronic circuit according to claim 1, wherein said controller is a wireless medium access controller.

12. Electronic circuit according to claim 1, wherein said electronic circuit is part of either a transmitter or a receiver.

13. In an electronic circuit having a frequency signal conversion device arranged to receive a first signal at a first frequency ($f_t$) and to transform the first signal into an intermediate signal at an intermediate frequency ($f_i$) by applying a first selection frequency ($f_{loc}$) received from a local oscillator and having a band-pass filter that performs a band-pass filtering of the intermediate signal at an intrinsic center frequency ($f_{bpf}$), a method comprising the steps of:
receiving data indicative of a shift of the intrinsic center frequency ($f_{bpf}$) due to a temperature deviation of the band-pass filter from a predetermined working temperature, and
controlling the first selection frequency ($f_{loc}$) of the local oscillator for changing the intermediate frequency ($f_i$) of the intermediate signal to follow the shift of the intrinsic center frequency ($f_{bpf}$).

* * * * *